United States Patent
Caya et al.

(10) Patent No.: US 8,118,288 B2
(45) Date of Patent: Feb. 21, 2012

(54) ISOLATION MOUNT SYSTEM

(75) Inventors: Donald M. Caya, Wales, WI (US);
Mark Braker, Jackson, WI (US);
Walter A. Jurek, Franklin, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 692 days.

(21) Appl. No.: 12/242,045

(22) Filed: Sep. 30, 2008

(65) Prior Publication Data
US 2009/0085264 A1 Apr. 2, 2009

Related U.S. Application Data

(60) Provisional application No. 60/976,595, filed on Oct. 1, 2007.

(51) Int. Cl.
*F16F 5/00* (2006.01)
(52) U.S. Cl. .......... 267/140.11; 267/141; 180/291; 180/299
(58) Field of Classification Search .......... 267/140.11, 267/140.13, 141, 141.2; 180/291, 296, 299; 248/636–638, 675
See application file for complete search history.

(56) References Cited

U.S. PATENT DOCUMENTS

| | | | |
|---|---|---|---|
| 2,034,764 A | 3/1936 | Lee | |
| 2,953,336 A | 9/1960 | Etchells | |
| 3,747,879 A | 7/1973 | Houk | |
| 3,841,425 A * | 10/1974 | Harkness | 180/53.1 |
| 4,114,713 A | 9/1978 | Mery | |
| 4,288,096 A | 9/1981 | Enokimoto et al. | |
| 4,311,204 A | 1/1982 | Shupert | |
| 4,399,974 A | 8/1983 | Takei | |
| 4,403,762 A | 9/1983 | Cogswell, II et al. | |
| 4,405,027 A | 9/1983 | Enokimoto et al. | |
| 4,407,383 A | 10/1983 | Enokimoto et al. | |
| 5,570,757 A | 11/1996 | Courtwright et al. | |
| 5,597,181 A | 1/1997 | Lyles et al. | |
| 5,701,969 A | 12/1997 | Stephens | |
| 5,836,412 A | 11/1998 | Lyles et al. | |
| 6,047,942 A | 4/2000 | Kennedy | |
| 6,287,159 B1 | 9/2001 | Polakowski et al. | |
| 6,397,965 B1 | 6/2002 | McFarlane et al. | |
| 6,499,441 B2 | 12/2002 | Suzuki | |
| 6,677,684 B1 | 1/2004 | Kennedy | |

(Continued)

FOREIGN PATENT DOCUMENTS
EP  1146213  10/2001

*Primary Examiner* — Pamela Rodriguez
(74) *Attorney, Agent, or Firm* — Michael Best & Friedrich LLP

(57) ABSTRACT

An engine mount system for a lawn mower having a front, rear, and two sides. The engine mount system includes a mounting plate, an engine, first and second elastic members, and first and second brackets. The engine is mounted to the mounting plate and applies a torque force to the mounting plate during lawn mower operation. The first bracket is provided on the mounting plate and includes a first surface. The first surface is adjacent the first elastic member and partially faces the front, thereby placing the first elastic member into compression when the engine applies the torque force to the mounting plate. The second bracket is provided on the mounting plate and includes a second surface. The second surface is adjacent the second elastic member and partially faces the rear, thereby placing the second elastic member into compression at the same time as the first elastic member.

20 Claims, 9 Drawing Sheets

U.S. PATENT DOCUMENTS

| | | |
|---|---|---|
| 6,959,922 B2 | 11/2005 | Miyahara |
| 7,083,024 B2 | 8/2006 | Bergman et al. |
| 7,195,094 B2 | 3/2007 | Street et al. |
| 2001/0029908 A1 | 10/2001 | Suzuki |
| 2004/0035633 A1 | 2/2004 | Bergman et al. |
| 2004/0124034 A1 | 7/2004 | Komatsu et al. |
| 2006/0180965 A1 | 8/2006 | Howorth et al. |
| 2008/0054538 A1* | 3/2008 | Igami .................. 267/140.11 |

* cited by examiner

ISOLATION MOUNT SYSTEM

RELATED APPLICATION DATA

This application claims benefit under 35 U.S.C. Section 119(e) of U.S. Provisional Application No. 60/976,595 filed Oct. 1, 2007, which is fully incorporated herein by reference.

BACKGROUND

The present invention relates to an isolation mount system, and more particularly to an isolation mount system for a riding mower or lawn tractor that reduces the transmission of vibrations from the engine to the device frame.

SUMMARY

In one aspect, the invention provides a prime mover mount system for a device, the device having a front, a rear, and two sides. The prime mover mount system includes a prime mover mount member, a prime mover, a first elastic member, a second elastic member, a first bracket, and a second bracket. The prime mover is mounted to the prime mover mount member, and the prime mover applies a torque force to the prime mover mount member during device operation. The first bracket is provided on the prime mover mount member and includes a first surface. The first surface is adjacent the first elastic member, and the first surface partially faces the front, thereby placing the first elastic member into compression when the prime mover applies the torque force to the prime mover mount member. The second bracket is provided on the prime mover mount member and includes a second surface. The second surface is adjacent the second elastic member, and the second surface partially faces the rear, thereby placing the second elastic member into compression at the same time as the first elastic member when the prime mover applies the torque force to the prime mover mount member.

In another aspect, the invention provides an engine mount system for a lawn mower, the lawn mower having a front, a rear, and two sides. The engine mount system includes a mounting plate, an engine, a first elastic member, a second elastic member, a first bracket, and a second bracket. The engine is mounted to the mounting plate, and the engine applies a torque force to the mounting plate during lawn mower operation. The first bracket is provided on the mounting plate and includes a first surface. The first surface is adjacent the first elastic member, and the first surface partially faces the front, thereby placing the first elastic member into compression when the engine applies the torque force to the mounting plate. The second bracket is provided on the mounting plate and includes a second surface. The second surface is adjacent the second elastic member, and the second surface partially faces the rear, thereby placing the second elastic member into compression at the same time as the first elastic member when the engine applies the torque force to the mounting plate.

In another aspect, the invention provides a prime mover mount system for a device, the device having a front, a rear, a top, a bottom, a first side, a second side, and an x-axis from the front to the back, a y-axis from the bottom to top, and a z-axis from the first side to the second side. The prime mover mount system includes a prime mover mount member, a prime mover, a first elastic member, a second elastic member, a first bracket, and a second bracket. The prime mover is mounted to the prime mover mount member, and the prime mover applies a torque force to the prime mover mount member during device operation. The first bracket is provided on the prime mover mount member and includes a first surface defining a first plane, the first plane having a first normal axis. The first bracket is configured to engage the first elastic member. The first normal axis is oriented at a first compound angle defined by a first angle $\alpha 1$ with respect to the z-axis in a front orthogonal view and a second angle $\beta 1$ with respect to the x-axis in a first side orthogonal view. The first angle $\alpha 1$ is between 20 and 70 degrees and the second angle $\beta 1$ is between 20 and 70 degrees. The second bracket is provided on the prime mover mount member and includes a second surface defining a second plane, the second plane having a second normal axis. The second bracket is configured to engage the second elastic member, and the second normal axis is oriented at a second compound angle defined by a third angle $\alpha 2$ with respect to the z-axis in a front orthogonal view and a fourth angle $\beta 2$ with respect to the x-axis in a second side orthogonal view. The third angle $\alpha 2$ is between 20 and 70 degrees and the fourth angle $\beta 2$ is between 20 and 70 degrees.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
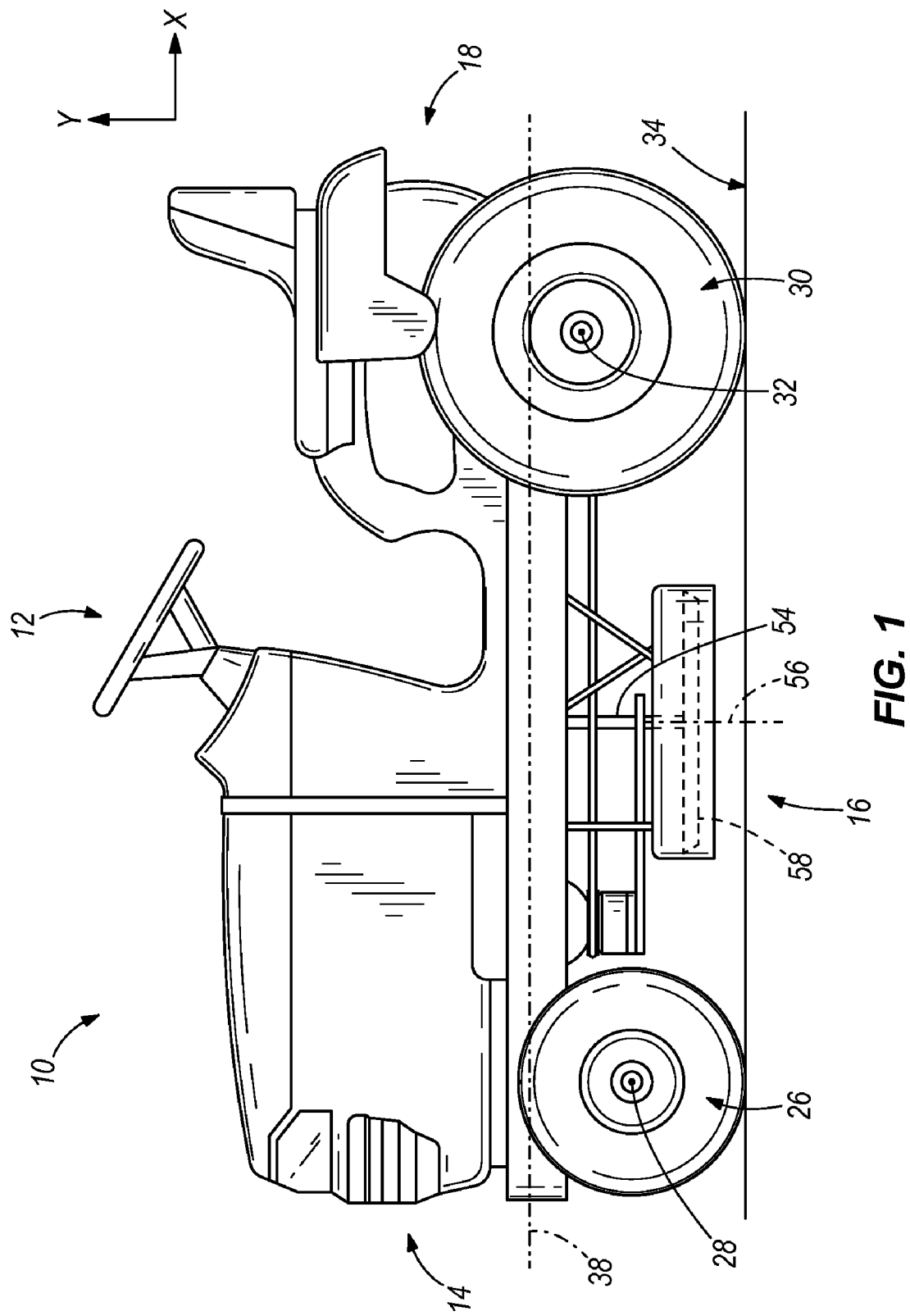
FIG. 1 is a drawing of a riding mower including the isolation mount system according to the present invention.

FIG. 1 illustrates a device, such as a riding lawn mower 10, according to one embodiment of the present invention. Other constructions of the invention could pertain to other types of engine- or motor-driven equipment, such as tractors and other types of agricultural, forestry, golf, lawn and garden, construction, military, commercial or residential outdoor power equipment and vehicles.

The riding mower 10 includes a front 14 facing the direction of principal motion of the riding mower 10, and a rear 18 opposite the front. A left side 22 (FIG. 4) is normal to the front 14 and the rear 18, and a right side 24 (FIG. 3) is opposite the left side 22. A bottom 16 is normal to the front 14 and the sides 22, 24, and a top 12 is opposite the bottom 16. A first pair of wheels 26 and a second pair of wheels 30 are coupled to the riding mower 10 and supported by a support surface 34 for movement of the riding mower 10 relative to the support surface 34. A longitudinal axis 38 runs from the front 14 to the rear 18 of the riding mower 10 normal to a first wheel rotation axis 28 of the first pair of opposed wheels 26 and second wheel rotation axis 32 of the second pair of opposed wheels 30.

An x-axis is defined parallel to the longitudinal axis 38 of the device 10. A y-axis is normal to the x-axis in a vertical, or bottom 16 to top 12, direction. The y-axis is also normal to the first and second wheel rotation axes 28, 32. A z-axis (FIG. 3) is normal to the x-axis and parallel to the first and second wheel rotation axes 28, 32.

With reference to FIGS. 2-9, an isolation plate 42 provides a mounting surface to which an engine 46 or other prime mover (e.g., an electric motor) and a muffler 50 (provided the prime mover is an engine) are attached. The engine 46 includes a rotating shaft 54 (FIG. 1) that rotates about an axis 56 normal to the isolation plate 42. In the illustrated embodiment, a blade 58 or other implement is coupled to the rotating shaft 54 for cutting grass and other vegetation. The isolation plate 42 is mounted to the device frame 86 by way of angled isolation mounts having elastic elements, as described in greater detail below, such that the engine 46 and muffler 50 are isolated from the device frame 86 to reduce the transfer of vibrations to the device frame.

The isolation plate 42 includes a planar portion defining a mounting plane 62 substantially parallel to the support surface 34, and defining a first side and a second side of the isolation plate or mounting member 42. The engine 46 is mounted to the first side and the muffler 50 is mounted to the second side. In a preferred embodiment, the muffler 50 is attached to the isolation plate 42 using one or more bolts, but a weld or other fastener may also be used. In another construction, the muffler 50 may be mounted to the top (i.e., first side) of the isolation plate 42. In other constructions, the muffler 50 may not be mounted to the isolation plate 42 at all; however, advantages of mounting the muffler 50 may include noise reduction and vibration reduction. A muffler hanging in free space may sound louder than a muffler attached to an isolation device, and a muffler attached to a device frame would not be isolated from the device, or vehicle, frame.

Two apertures 66 in the isolation plate 42 provide a passageway through which exhaust pipes (not shown) may pass to transport exhaust gases from the engine 46 to the muffler 50 via inlet apertures in the muffler. If such is the case, one, three, or more exhaust pipes may exist and therefore necessitate a corresponding number of apertures 66 adjacent each exhaust gas inlet. Additionally, the exhaust pipes may be routed around the isolation plate 42 such that no apertures 66 are needed. In a preferred embodiment, the exhaust pipes do not contact the isolation plate 42, although they may in other constructions. Also, a grommet or a fastener may be used to fasten the pipes to the isolation plate 42 as they pass through the apertures 66. In a preferred embodiment, exhaust pipes are attached to the muffler 50 using a slip-fit. In another construction, the exhaust pipes may be welded or attached to the muffler 50 using a grommet; however, welding may cause the pipes to warp, resulting in parts that do not fit properly and causing difficulties during assembly.

As best shown in FIGS. 2, 4, 5 and 8, a first isolation mount 70 positioned on the left 22 has a first left bracket 74, a second left bracket 78 and an elastic element 82 sandwiched between the first left bracket 74 and the second left bracket 78. The surface 76 of the first left bracket 74 (FIG. 6) that engages the elastic element 82 partially faces the front 14 and the right 24 of the device 10 such that the torque force $F_T$ (FIG. 5) from the prime mover 46 and exerted on the isolation plate 42 has a component normal to the surface 76 of the first left bracket 74 to compress the elastic element 82 against the second left bracket 78. A surface that "faces" a side (or top, bottom, front, rear, etc.) as used herein means a surface that is non-normal to the side and has a normal vector projecting from the surface that intersects the side. For example, the surface 76 of the first left bracket 74 is non-normal to the right side 24 and has a normal vector projecting from the surface (e.g., a first normal axis 154 in a direction projecting away from the first left bracket 74 and more specifically, away from the surface 76) that intersects the right side 24.

Figure 4:
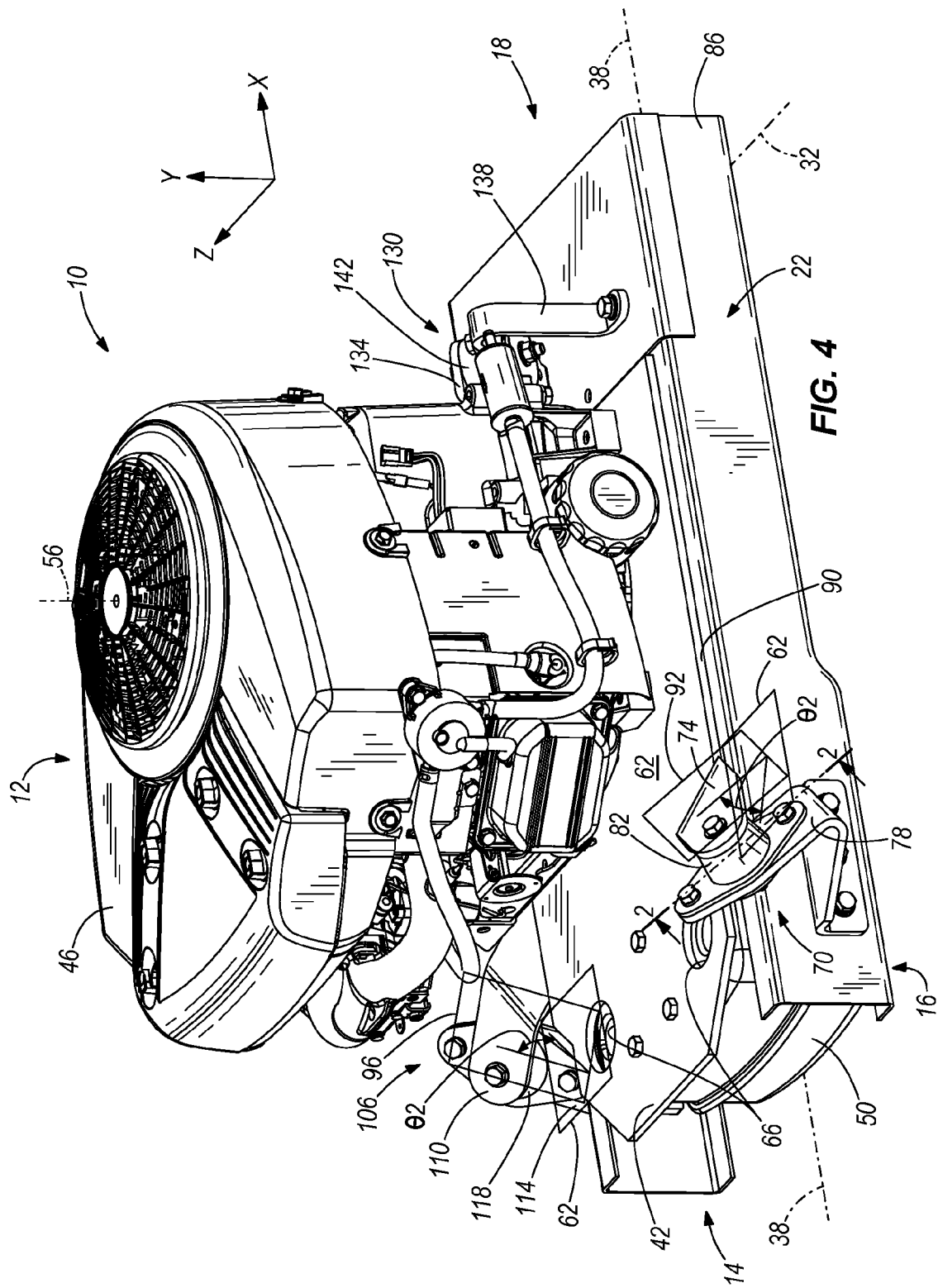
FIG. 4 is a front perspective view of the isolation mount system.

The second left bracket 78 is attached to the device frame 86. As best shown in FIG. 4, the second left bracket 78 is preferably attached to the device frame 86 by a weld and one or more bolts, or other fasteners, but may be attached by fasteners or welds alone in other constructions. Thus, the first isolation mount 70 acts to place the elastic element 82 in compression to reduce the transmission of torque forces $F_T$ into the device frame 86. In other constructions, the first isolation mount 70 may be oriented in different ways that act to place the elastic element 82 in compression to reduce the transmission of torque forces $F_T$ into the device frame 86.

The first isolation mount 70, including the surface 76 of the first left bracket 74 that engages the elastic element 82, also partially faces the bottom 16. Thus, the first isolation mount 70 also acts to place the elastic element 82 in compression due to vibrations of the engine 46 and muffler 50 in vertical and horizontal directions.

The first left bracket 74 is provided on the isolation plate 42. That is, in a preferred construction, the first left bracket 74 is formed with the isolation plate 42 adjacent a first edge 90 of the isolation plate 42, but may be welded, bolted to or fastened to the isolation plate 42 in any suitable fashion. The surface 76 of the first left bracket 74 that engages the elastic element 82 (and similarly that of the second left bracket 78) includes a first normal axis 154 that is generally oriented at a compound angle having a first angle α1 in a front (or rear) orthogonal view, a second angle β1 in a left side (or right side) orthogonal view and a third angle ω1 in a top (or bottom) orthogonal view. The first angle α1 is relative to the first and second wheel rotation axes 28, 32 and z-axis of the device 10. It is to be understood that the first or second wheel rotation axes 28, 32 and the z-axis are parallel and therefore form the same angle with respect to the first normal axis 154 (Euclid's Elements, Book I, Postulate 29). Similarly, this principle applies to all of the parallel angles herein. Furthermore, it is to be understood that for the ease of illustration, some of the angles shown in the drawings are shown relative to edges or lines that are parallel to the axes defined herein. While these angles are not shown at the intersection of the axes as described herein, it is to be understood that these angles are formed with lines that are parallel to the axes described herein and are therefore equivalent angles.

The second angle β1 is relative to the longitudinal axis 38 and x-axis. The first angle α1 is between 20 and 70 degrees and the second angle β1 is between 20 and 70 degrees. The third angle ω1 is relative to the longitudinal axis 38 and x-axis. The third angle ω1 is between 30 and 60 degrees. In a preferred construction, the first angle α1 is approximately equal to 55 degrees, the second angle β1 is approximately equal to 55 degrees, and the third angle ω1 is approximately equal to 45 degrees.

The surface 76 extends away from the isolation plate 42 and defines a first isolation plane 92. The first isolation plane 92 and the mounting plane 62 form a first angle θ1 of approximately 45 degrees in the illustrated construction. However, it is to be understood that θ1 will vary depending on the particular values selected for the first angle α1, the second angle β1, and the third angle ω1.

Figure 3:
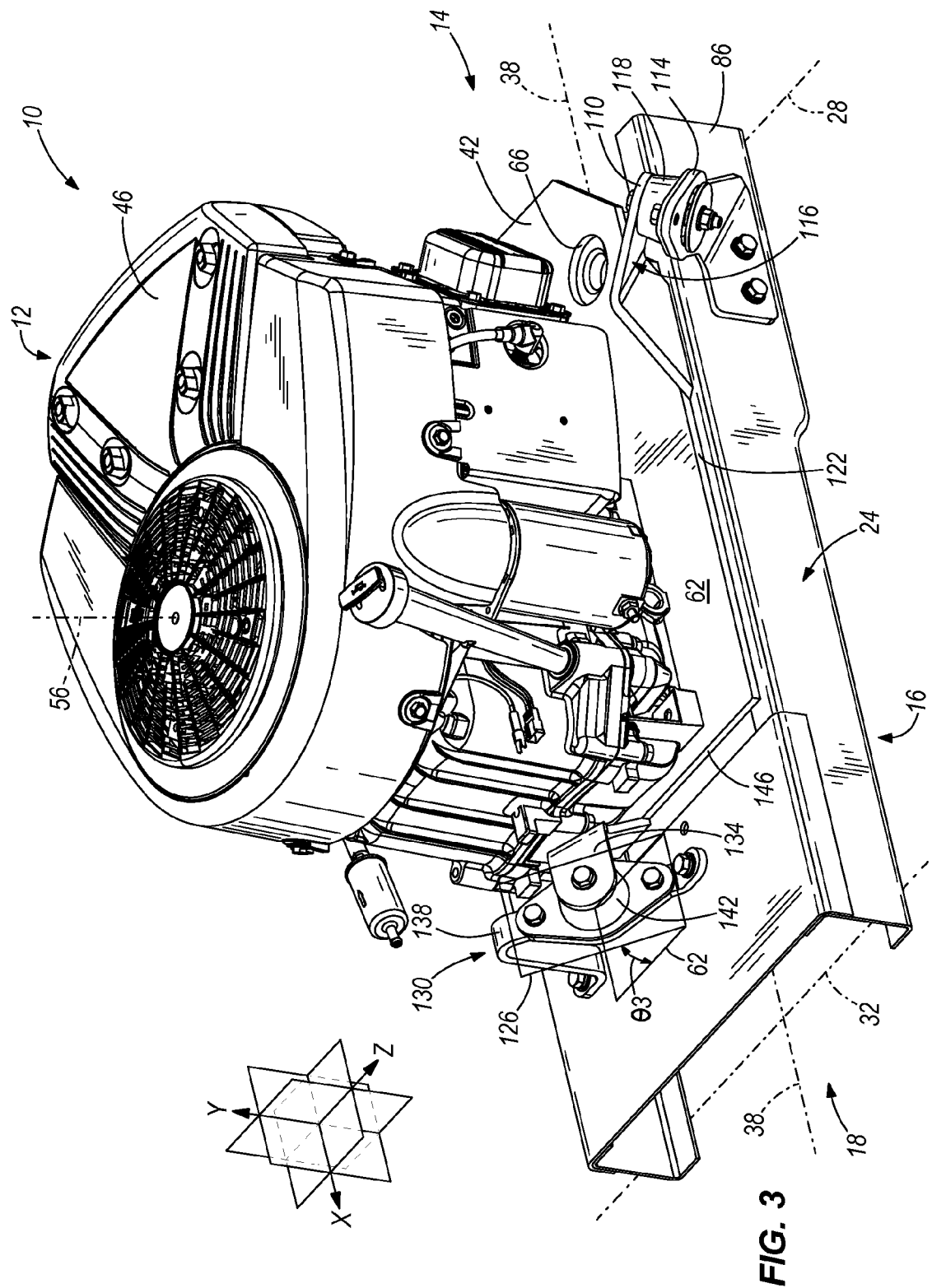
FIG. 3 is a rear perspective view of the isolation mount system.
Figure 5:
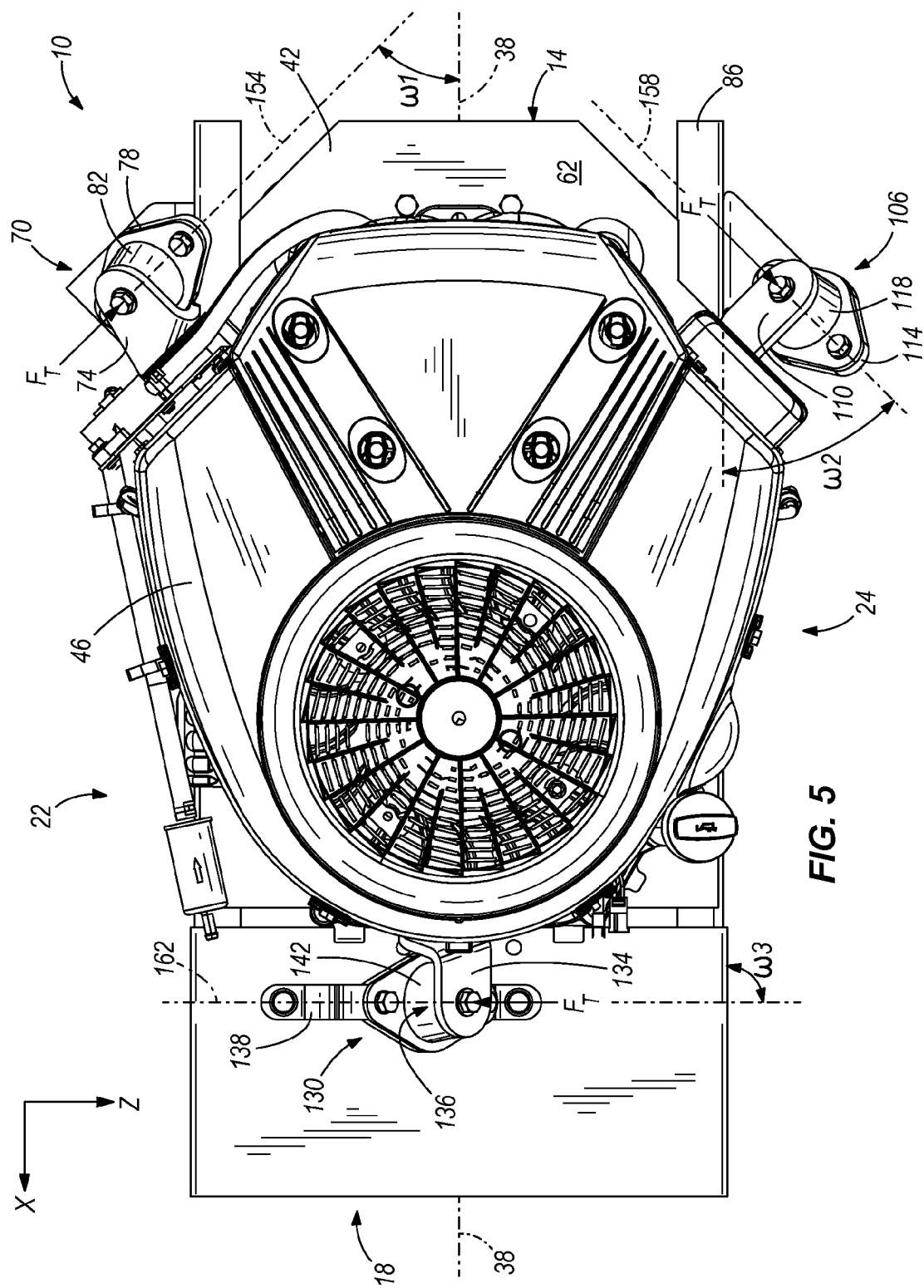
FIG. 5 is a top view of the isolation mount system.
Figure 6:
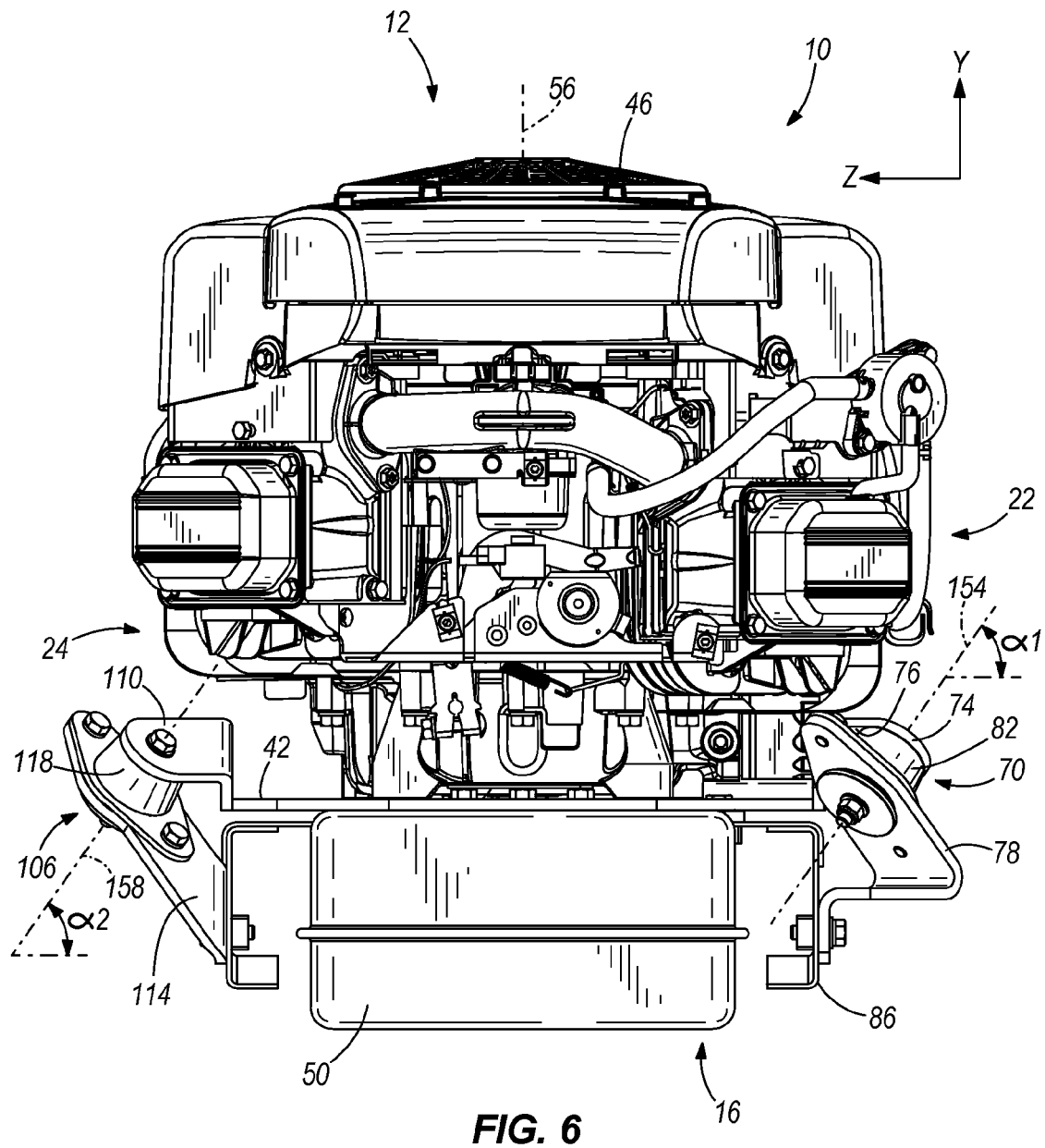
FIG. 6 is a front view of the isolation mount system.
Figure 7:
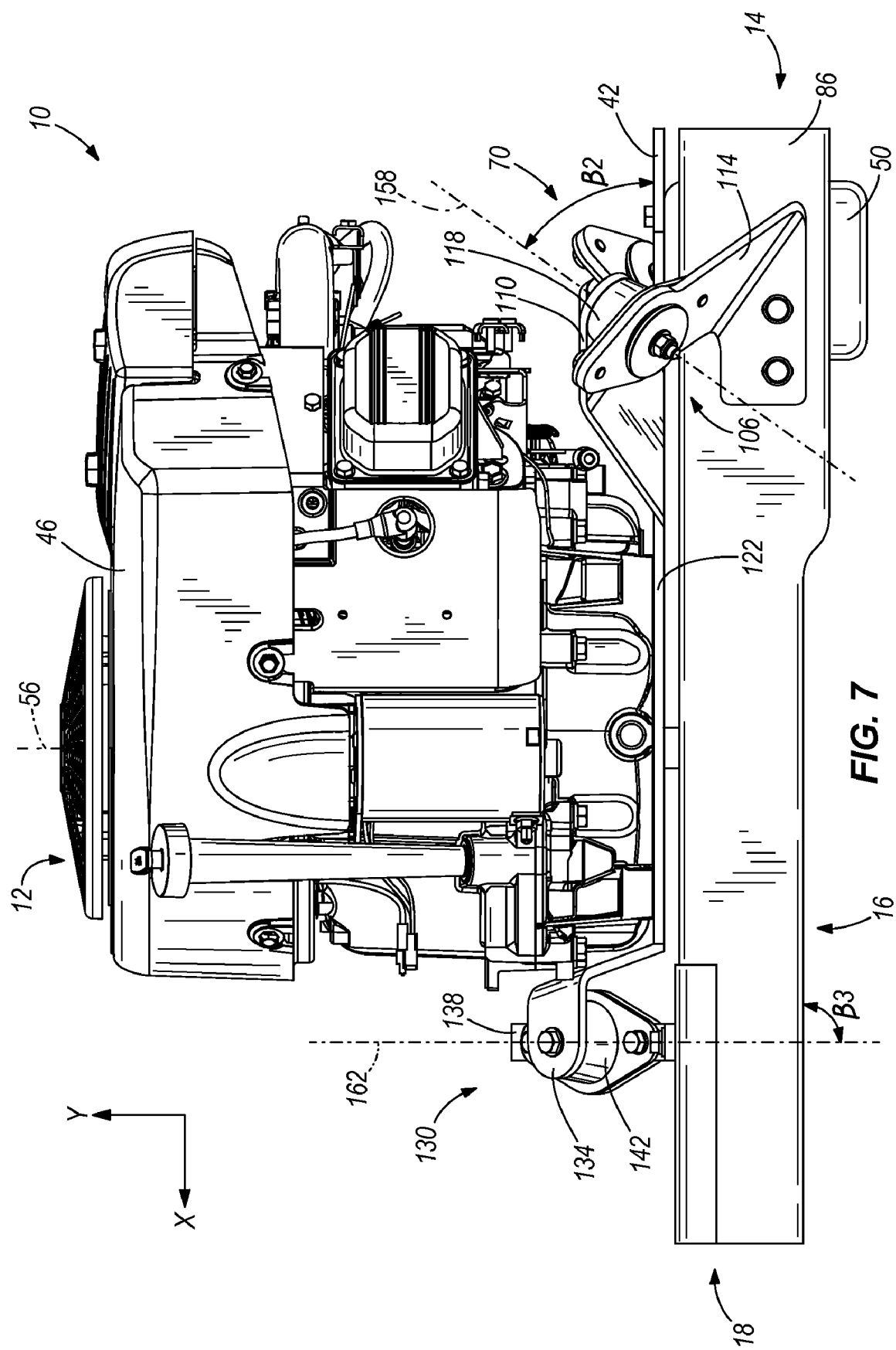
FIG. 7 is a right side view of the isolation mount system.

As best shown in FIGS. 5 and 7, a second isolation mount 106 positioned on the right 24 has a first right bracket 110, a second right bracket 114 and an elastic element 118 sandwiched between the first right bracket 110 and the second right bracket 114. The surface of the first right bracket 116 that engages the elastic element 118 partially faces the rear 18 of the device 10 such that the torque force $F_T$ (FIG. 5) from the prime mover and exerted on the isolation plate 42 has a component normal to the surface of the first right bracket 110 to compress the elastic element 118 against the second right bracket 114. The second right bracket 114 is attached to the device frame 86. As best shown in FIG. 3, the second right bracket 114 is preferably attached to the device frame 86 by a weld and one or more bolts, or other fasteners, but may be attached by fasteners or welds alone in other constructions. Thus, the second isolation mount 106 acts to place the elastic element 118 in compression to reduce the transmission of torque forces $F_T$ into the device frame 86. In other constructions, the second isolation mount 106 may be oriented in different ways that act to place the elastic element 118 in compression to reduce the transmission of torque forces $F_T$ into the device frame 86.

The second isolation mount 106, including the surface of the first right bracket 116 that engages the elastic element 118, also partially faces the bottom 16. Thus, the second isolation mount 106 also acts to place the elastic element 118 in compression due to vibrations of the engine 46 and muffler 50 in vertical and horizontal directions.

The first right bracket 110 is provided on the isolation plate 42. That is, in a preferred construction, the first right bracket 110 is formed with the isolation plate 42 adjacent a second edge 122 of the isolation plate 42, but may be welded to or fastened to the isolation plate 42 in any suitable fashion. The surface of the first right bracket 116 that engages the elastic element 118 (and similarly that of the second right bracket 114) includes a second normal axis 158 that is generally oriented at a compound angle having a first angle α2 in a front (or rear) orthogonal view, a second angle β2 in a left side (or right side) orthogonal view and a third angle ω2 in a top (or bottom) orthogonal view. The first angle α2 is relative to the first and second wheel rotation axes 28, 32 and z-axis of the device 10. The second angle β2 is relative to the longitudinal axis 38 and x-axis. The first angle α2 is between 20 and 70 degrees and the second angle β2 is between 20 and 70 degrees. The third angle ω2 is relative to the longitudinal axis 38 and x-axis. The third angle ω1 is between 30 and 60 degrees. In a preferred construction, the first angle α2 is approximately equal to 55 degrees, the second angle β2 is approximately equal to 55 degrees, and the third angle ω2 is approximately equal to 45 degrees.

The surface 116 extends away from the isolation plate 42 and defines a second isolation plane 96. The second isolation plane 96 and the mounting plane 62 form an angle θ2 of approximately 45 degrees. However, it is to be understood that θ2 will vary depending on the particular values selected for the first angle α2, the second angle β2, and the third angle ω2.

Figure 9:
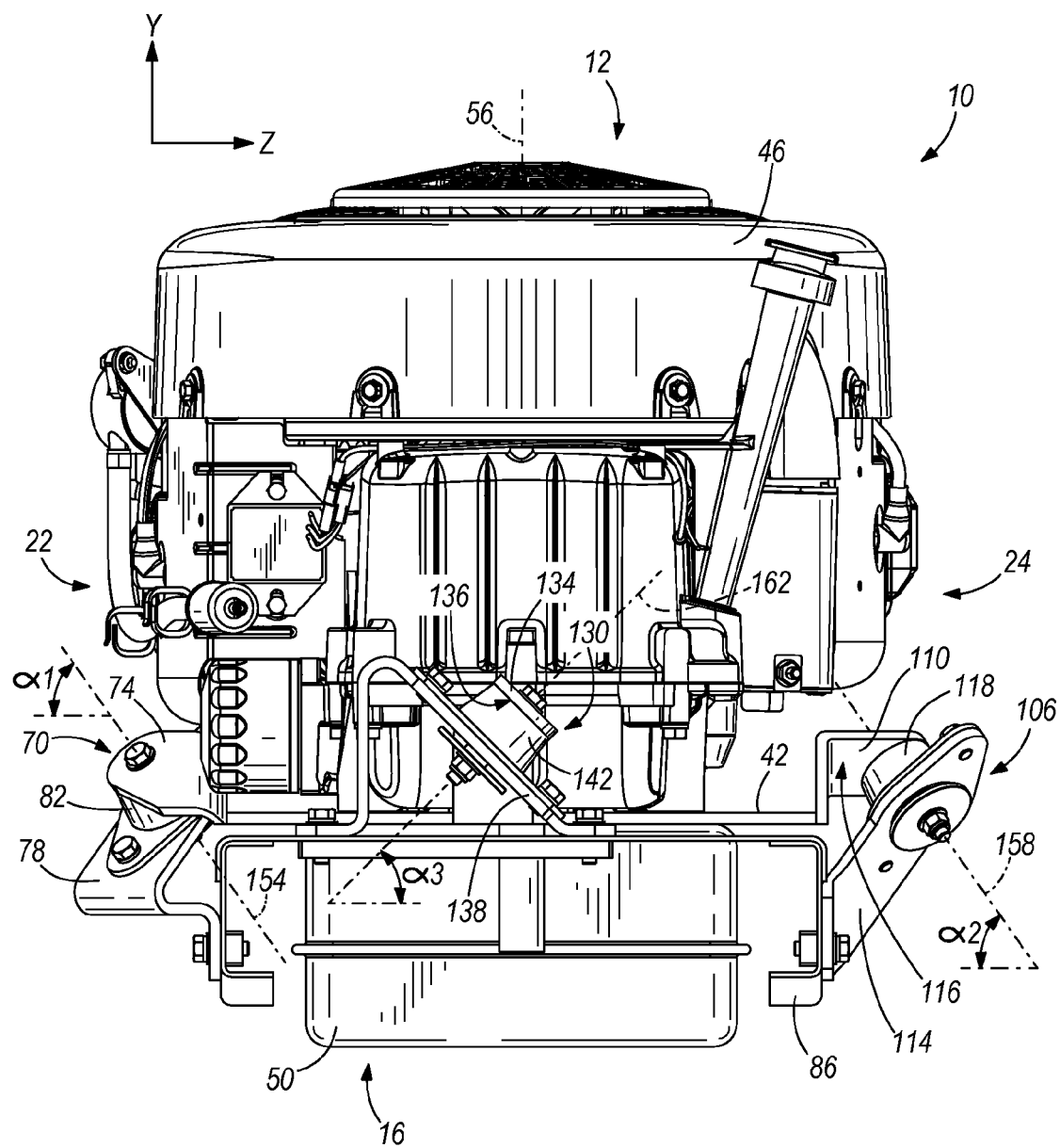
FIG. 9 is a rear view of the isolation mount system.

As best shown in FIGS. 3, 5 and 9, a third isolation mount 130 positioned in the rear 18 has a first rear bracket 134, a second rear bracket 138 and an elastic element 142 sandwiched between the first rear bracket 134 and the second rear bracket 138. The second rear bracket 138 is attached to the device frame 86. As best shown in FIG. 9, the second rear bracket 138 is preferably attached to the device frame 86 by a weld and one or more bolts 38, or other fasteners, but may be attached by fasteners or welds alone in other constructions. The surface 136 of the first rear bracket 134 that engages the elastic element 142 partially faces the left 24 of the device 10 such that component of the torque force $F_T$ exerted on the isolation plate 42 by the prime mover is normal to the surface 136 of the first rear bracket 134 to compress the elastic element 142 against the second rear bracket 138. Thus, the third isolation mount 130 acts to place the elastic element 142 in compression to reduce the transmission of torque forces $F_T$ into the device frame 86. In other constructions, the third isolation mount 130 may be oriented in different ways that act to place the elastic element 142 in compression to reduce the transmission of torque forces $F_T$ into the device frame 86.

The third isolation mount 130, including the surface of the first rear bracket 134 that engages the elastic element 142, also partially faces the bottom 16. Thus, the third isolation mount 130 also acts to place the elastic element 142 in compression due to vibrations of the engine 46 and muffler 50 in vertical directions.

The first rear bracket 134 is provided on the isolation plate 42. That is, in the illustrated construction, the first rear bracket 134 is formed with the isolation plate 42 adjacent a third edge 146 of the isolation plate 42, but may be welded to or fastened to the isolation plate 42 in any suitable fashion. The surface 136 of the first rear bracket 134 that engages the elastic element 142 (and similarly that of the second rear bracket 138) has a third normal axis 162 that is oriented at a first angle α3 in a rear orthogonal view, as shown in FIG. 9. The first angle α3 is relative to the first and second wheel rotation axes 28, 32 and the z-axis. The first angle α3 is between 30 and 60 degrees. In a preferred construction, the angle α3 is substantially equal to 45 degrees.

Figure 8:
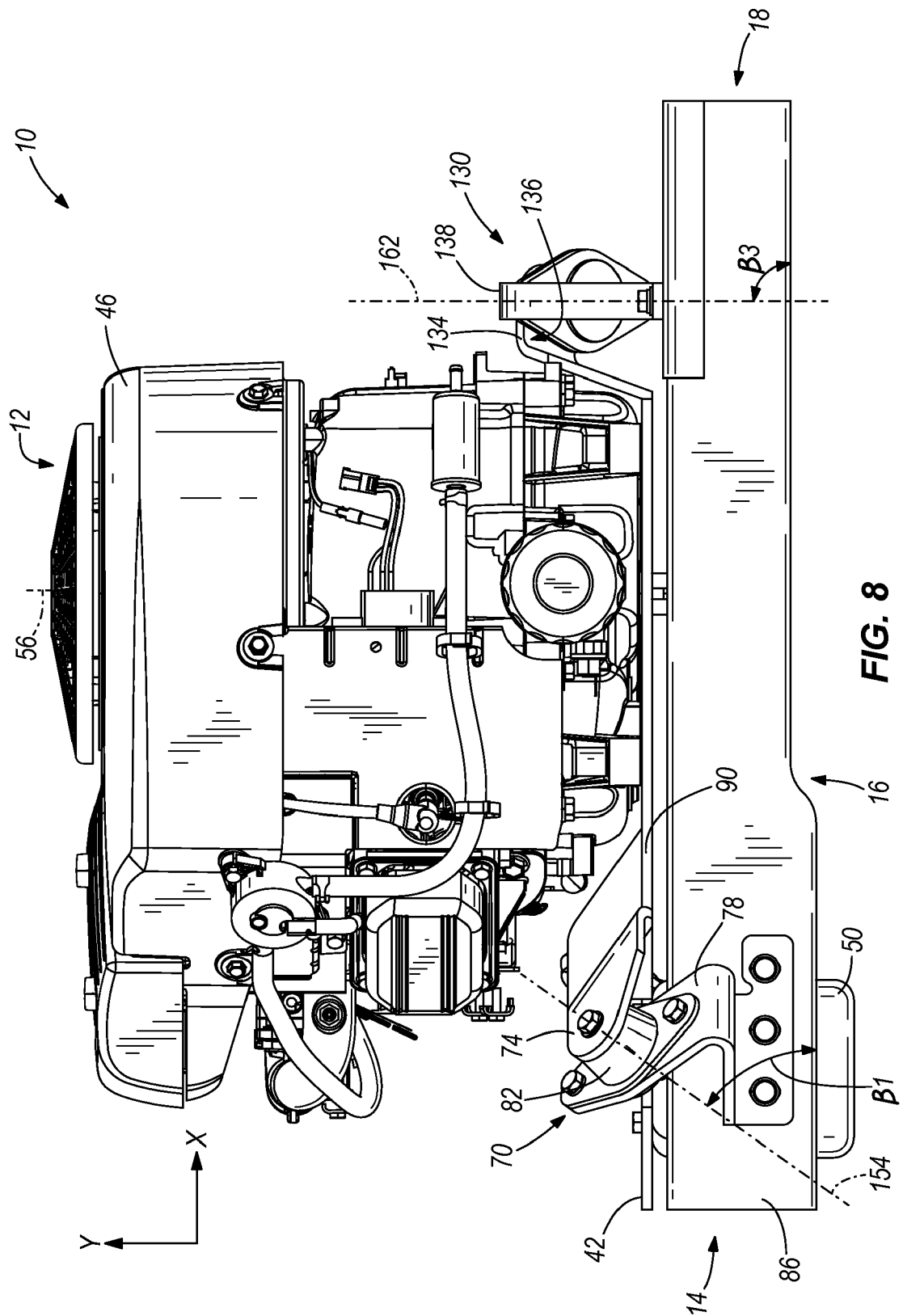
FIG. 8 is a left side view of the isolation mount system.

The third normal axis 162 is oriented at a second angle β3 in a right (or left) side orthogonal view (FIG. 8). The second angle β3 is relative to the longitudinal axis 38 and the x-axis. The second angle β3 is between 60 and 120 degrees; however, in a preferred construction, the second angle β3 is substantially equal to 90 degrees, or normal to the longitudinal axis 38 and x-axis.

The third normal axis 162 is oriented at a third angle ω3 in a top (or bottom) orthogonal view (FIG. 5). The third angle ω3 is relative to the longitudinal axis 38 and the x-axis. The third angle ω3 is between 60 and 120 degrees; however, in a preferred construction, the third angle ω3 is substantially equal to 90 degrees, or normal to the longitudinal axis 38 and x-axis.

The surface 136 extends away from the isolation plate 42 and defines a third isolation plane 126. The third isolation plane and the mounting plane 62 form an angle θ3 that is the same as α3 in the illustrated construction, i.e., substantially 45 degrees. However, it is to be understood that in other constructions, the third isolation mount 130 may be placed at a compound angle, similar to the first and second isolation mounts 70, 106, thus forming an angle θ3 depending on compounded angles from different orthogonal views.

Figure 2:
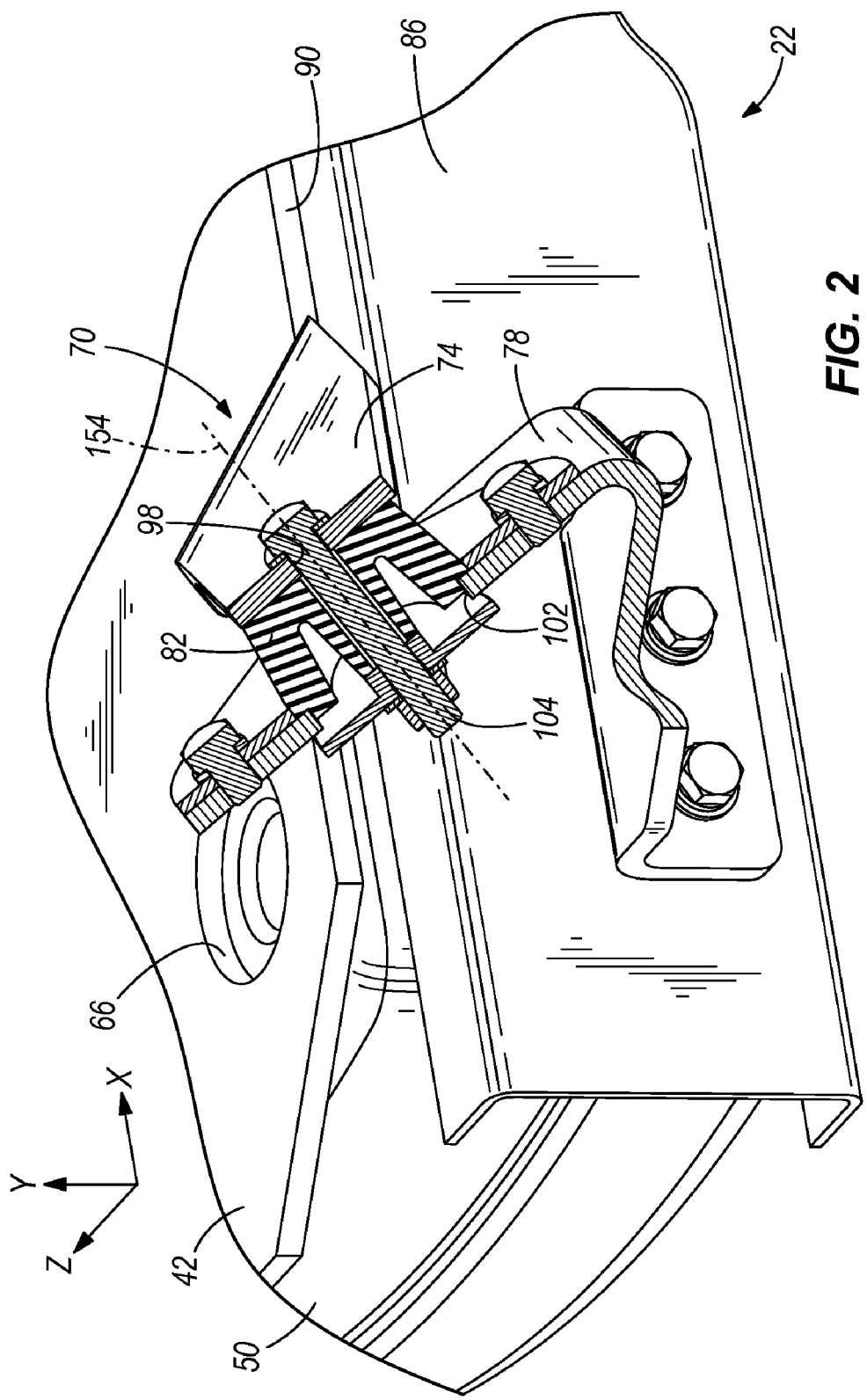
FIG. 2 is a cross section of a portion of the isolation mount system.

While FIG. 2 illustrates a cross section of the first isolation mount 70, it is to be understood that the second and third isolation mounts 106, 130 have similar cross sections and are sandwiched in substantially the same way. Therefore, cross sections of the second and third isolation mounts 106, 130 are not shown. The first left bracket 74 and the second left bracket 78 include apertures 98, 102 respectively, through which a bolt or other fastener 104 may be positioned to couple the first left bracket 74, the second left bracket 78 and the elastic element 82. Similarly, the first right bracket 110 and the second right bracket 114 and the first rear bracket 134 and the second rear bracket 138 include apertures and fasteners to couple the respective brackets and elastic elements in the same manner.

Furthermore, it is to be understood that the description of the elastic element, or elastic member 82, is substantially the same for elastic elements, or elastic members, 118 and 142. The following description of elastic element 82 can be applied to elastic elements 118 and 142. With further reference to FIG. 2, the elastic element 82 is preferably made of rubber but could be made of another elastic or viscoelastic material suited to provide a vibration dampening effect, and is preferably substantially a cylinder or a truncated cone that is wider at the base, but could having another shape, such as a cube or other polyhedron. Springs such as coil springs or leaf springs may also be used. The base of the elastic element 82 widens into a flat diamond-like shape in order to provide space for at least one mounting aperture through which the base of the elastic element 82 is fastened to the second left bracket 78. In a preferred embodiment, there are two mounting apertures in the base. A third through-hole passes through the middle of the elastic element 82 to provide an aperture through which a fastener, such as a bolt or other fastener, can be used to fasten the elastic element 82 to the first left bracket 74 and the second left bracket 78.

The dampening of torsional and vibrational forces is achieved by the compression of the elastic members 82, 118, 142. Placing the elastic members 82, 118, 142 in tension or shear is not typically desirable; however, the isolation mount system of the present invention is oriented to dampen forces in multiple directions. Therefore, the elastic members 82, 118, 142 may be placed in some amount of shear or tension with respect to some of the torsional or vibrational forces in combination with compression. The overall effect of orienting the mounts at compounded angles in multiple orthogonal directions, as described above, is an isolation mount system that dampens forces in multiple directions simultaneously.

The angles $\omega 1$, $\omega 2$ and $\omega 3$ (FIG. 5) of the isolation mounts 70, 106, 130 are selected to dampen, by compressing the respective elastic member, torque and vibrations transferred to the device frame 86 from the rotation of the rotating shaft 54 of the engine 46 or other prime mover and the load on the blade 58 or other implement. In the view of FIG. 5, the engine 46 rotates in a clockwise direction about the axis 56. As can be seen, the isolation mounts 70, 106, 130 are oriented to be placed in compression with respect to torque forces $F_T$ caused by rotation of the engine 46.

The angles $\alpha 1$, $\alpha 2$, $\alpha 3$, $\beta 1$, $\beta 2$ and $\beta 3$ (FIGS. 7-9) of the isolation mounts 70, 106, 130 are selected to dampen, by compressing the respective elastic member, vertical and horizontal vibrations such as vibrations caused by the muffler 50 and movement of the engine pistons.

In a preferred embodiment of the invention, the isolation mount system includes three isolation mounts 70, 106, 130. The isolation mounts 70, 106, 130 are configured such that three mounts cause a sufficient reduction in torsional and other vibration transmission from the engine 46, rotating shaft 54 and muffler 50 to the device frame 86 such that the operator does not experience undue discomfort due to sensed vibrations. The first isolation mount 70 and the second isolation mount 106 are located near the front 14 of the riding mower 10 on opposite sides (e.g., left 22 and right 24) of the isolation plate or mounting member 42. In other constructions, the first and second isolation mounts 70, 106 may be positioned near the rear 18, on different sides (e.g., front 14 and rear 18), or on opposite ends of the same side. The third isolation mount 130 is located in the rear 18 of the riding mower 10 along the longitudinal axis that bisects each pair of wheels 26, 30. In other constructions, the third isolation mount 130 may be positioned on any side. Together, the three isolation mounts 70, 106, 130 preferably form an isosceles triangle; however, in other constructions, the three isolation mounts could be configured in any triangle.

Thus, the invention provides, among other things, an isolation mount system. Various features and advantages of the invention are set forth in the following claims.

What is claimed is:

1. A prime mover mount system for a device, the device having a front, a rear, and two sides, the prime mover mount system comprising:
   a prime mover mount member;
   a prime mover mounted to the prime mover mount member, wherein the prime mover applies a torque force to the prime mover mount member during device operation;
   a first elastic member;
   a second elastic member;
   a first bracket provided on the prime mover mount member and including a first surface, wherein the first surface is adjacent the first elastic member, and wherein the first surface partially faces the front, thereby placing the first elastic member into compression when the prime mover applies the torque force to the prime mover mount member; and
   a second bracket provided on the prime mover mount member and including a second surface, wherein the second surface is adjacent the second elastic member, and wherein the second surface partially faces the rear, thereby placing the second elastic member into compression at the same time as the first elastic member when the prime mover applies the torque force to the prime mover mount member.

2. The prime mover mount system of claim 1, wherein the first and second brackets are on opposite sides of the prime mover mount member.

3. The prime mover mount system of claim 2, further comprising:
   a third elastic member; and
   a third bracket provided on the prime mover mount member adjacent a third side of the prime mover mount member, wherein the third bracket includes a third surface, and wherein the third surface is adjacent the third elastic member, and wherein the third surface partially faces one of the sides of the device, thereby placing the third elastic member into compression at the same time as the first elastic member and the second elastic member when the prime mover applies the torque force to the prime mover mount member.

4. The prime mover of claim 1, wherein the prime mover mount member includes a planar portion defining a mounting plane, and wherein the prime mover includes a rotating shaft normal to the mounting plane.

5. The prime mover mount system of claim 1, further comprising a device frame to which are coupled the first bracket and the second bracket by way of the first and second elastic members, respectively.

6. The prime mover mount system of claim 5, further comprising:

a third bracket provided on the device frame and including a third surface, wherein the third surface is adjacent the first elastic member, and wherein the third surface partially faces the rear; and a fourth bracket provided on the device frame and including a fourth surface, wherein the fourth surface is adjacent the second elastic member, and wherein the fourth surface partially faces the front.

7. The prime mover mount system of claim 1, wherein the first surface also partially faces one of the sides, and wherein the second surface also partially faces one of the sides.

8. An engine mount system for a lawn mower, the lawn mower having a front, a rear, and two sides, the engine mount system comprising:
   a mounting plate;
   an engine mounted to the mounting plate, wherein the engine applies a torque force to the mounting plate during lawn mower operation;
   a first elastic member;
   a second elastic member;
   a first bracket provided on the mounting plate and including a first surface, wherein the first surface is adjacent the first elastic member, and wherein the first surface partially faces the front, thereby placing the first elastic member into compression when the engine applies the torque force to the mounting plate; and
   a second bracket provided on the mounting plate and including a second surface, wherein the second surface is adjacent the second elastic member, and wherein the second surface partially faces the rear, thereby placing the second elastic member into compression at the same time as the first elastic member when the engine applies the torque force to the mounting plate.

9. The engine mount system of claim 8, wherein the first and second brackets are on opposite sides of the mounting plate.

10. The engine mount system of claim 9, further comprising:
   a third elastic member; and
   a third bracket provided on the mounting plate adjacent a third side of the mounting plate, wherein the third bracket includes a third surface, and wherein the third surface is adjacent the third elastic member, and wherein the third surface partially faces one of the sides of the lawn mower, thereby placing the third elastic member into compression at the same time as the first elastic member and the second elastic member when the engine applies the torque force to the mounting plate.

11. The engine of claim 8, wherein the mounting plate includes a planar portion defining a mounting plane, and wherein the engine includes a rotating shaft normal to the mounting plane.

12. The engine mount system of claim 8, further comprising a lawn mower frame to which are coupled the first bracket and the second bracket by way of the first and second elastic members, respectively.

13. The engine mount system of claim 12, further comprising:
   a third bracket provided on the lawn mower frame and including a third surface, wherein the third surface is adjacent the first elastic member, and wherein the third surface partially faces the rear; and
   a fourth bracket provided on the lawn mower frame and including a fourth surface, wherein the fourth surface is adjacent the second elastic member, and wherein the fourth surface partially faces the front.

14. The engine mount system of claim 8, wherein the first surface also partially faces one of the sides, and wherein the second surface also partially faces one of the sides.

15. A prime mover mount system for a device, the device having a front, a rear, a top, a bottom, a first side, a second side, and an x-axis from the front to the back, a y-axis from the bottom to top, and a z-axis from the first side to the second side, the prime mover mount system comprising:
   a prime mover mount member;
   a prime mover mounted to the prime mover mount member, wherein the prime mover applies a torque force to the prime mover mount member during device operation;
   a first elastic member;
   a second elastic member;
   a first bracket provided on the prime mover mount member and including a first surface defining a first plane, the first plane having a first normal axis, and wherein the first bracket is configured to engage the first elastic member, and wherein the first normal axis is oriented at a first compound angle defined by a first angle $\alpha 1$ with respect to the z-axis in a front orthogonal view and a second angle $\beta 1$ with respect to the x-axis in a first side orthogonal view, and wherein the first angle $\alpha 1$ is between 20 and 70 degrees and the second angle $\beta 1$ is between 20 and 70 degrees; and
   a second bracket provided on the prime mover mount member and including a second surface defining a second plane, wherein the second plane defines a second normal axis, and wherein the second bracket is configured to engage the second elastic member, and wherein the second surface is oriented at a second compound angle defined by a third angle $\alpha 2$ with respect to the z-axis in a front orthogonal view and a fourth angle $\beta 2$ with respect to the x-axis in a second side orthogonal view, and wherein the third angle $\alpha 2$ is between 20 and 70 degrees and the fourth angle $\beta 2$ is between 20 and 70 degrees.

16. The prime mover mount system of claim 15, wherein the first angle $\alpha 1$ is approximately 55 degrees and the second angle $\beta 1$ is approximately 55 degrees.

17. The prime mover mount system of claim 15, wherein the first bracket is adjacent the first side of the device and the second bracket is adjacent the second side of the device.

18. The prime mover mount system of claim 17, further comprising:
   a third elastic member; and
   a third bracket provided on the prime mover mount member adjacent the rear of the device, wherein the third bracket includes a third surface defining a third plane, and wherein the third bracket is configured to engage the third elastic member, and wherein the third surface includes a third normal axis that is oriented at a fifth angle $\beta 3$ with respect to the z-axis in a rear orthogonal view, and wherein the fifth angle $\beta 3$ is between 20 and 70 degrees.

19. The prime mover mount system of claim 15, further comprising a muffler coupled to the prime mover mount member.

20. The prime mover mount system of claim 15, wherein the prime mover mount member has a first side and a second side, and wherein the prime mover is mounted to the prime mover mount member on the first side, and wherein the muffler is coupled to the prime mover mount member on the second side.

* * * * *